United States Patent
Bales et al.

(10) Patent No.: US 11,634,989 B2
(45) Date of Patent: Apr. 25, 2023

(54) METHODS AND ASSEMBLIES FOR BONDING AIRFOIL COMPONENTS TOGETHER

(71) Applicant: Raytheon Technologies Corporation, Farmington, CT (US)

(72) Inventors: Daniel A. Bales, Avon, CT (US); Brian T. Hazel, Avon, CT (US); Thomas DeMichael, Stafford Springs, CT (US)

(73) Assignee: Raytheon Technologies Corporation, Farmington, MA (US)

( * ) Notice: Subject to any disclaimer, the term of this patent is extended or adjusted under 35 U.S.C. 154(b) by 249 days.

(21) Appl. No.: 16/859,493

(22) Filed: Apr. 27, 2020

(65) Prior Publication Data
US 2021/0332706 A1 Oct. 28, 2021

(51) Int. Cl.
*F01D 5/14* (2006.01)
*B23K 20/02* (2006.01)
*B23K 101/00* (2006.01)

(52) U.S. Cl.
CPC .............. *F01D 5/147* (2013.01); *B23K 20/02* (2013.01); *B23K 2101/001* (2018.08); *F05D 2230/236* (2013.01)

(58) Field of Classification Search
CPC ........ F05D 2230/236; B23K 2101/001; B23K 20/02; B23K 20/023; F01D 5/147
See application file for complete search history.

(56) References Cited

U.S. PATENT DOCUMENTS

| | | | |
|---|---|---|---|
| 5,109,606 A | 5/1992 | DeMichael | |
| 5,359,770 A | 11/1994 | Brown | |
| 6,003,756 A * | 12/1999 | Rhodes | B23K 20/02 144/350 |
| 6,378,755 B1 | 4/2002 | Grylls | |
| 9,511,436 B2 | 12/2016 | Kumar | |
| 2005/0199683 A1 | 9/2005 | Robertson | |
| 2011/0058949 A1 | 3/2011 | Marra | |
| 2015/0190893 A1 * | 7/2015 | Parkin | F01D 5/282 29/889.71 |
| 2018/0087387 A1 | 3/2018 | Shi | |
| 2020/0001411 A1 * | 1/2020 | Bales | B23K 37/0426 |

FOREIGN PATENT DOCUMENTS

| | | |
|---|---|---|
| DE | 102008058140 A1 | 5/2010 |
| DE | 102011011495 B4 | 5/2013 |

OTHER PUBLICATIONS

EP search report for EP21170795.5 dated Oct. 18, 2021.

* cited by examiner

*Primary Examiner* — Moshe Wilensky
(74) *Attorney, Agent, or Firm* — Getz Balich LLC (57) ABSTRACT

During a bonding process, a tip cap and an airfoil base are provided. The tip cap is arranged on the airfoil base. The tip cap is diffusion bonded to the airfoil base.

6 Claims, 14 Drawing Sheets

METHODS AND ASSEMBLIES FOR BONDING AIRFOIL COMPONENTS TOGETHER

BACKGROUND OF THE DISCLOSURE

1. Technical Field

This disclosure relates generally to connecting components of an airfoil together.

2. Background Information

An airfoil for a gas turbine engine may be configured with a tip cap connected to a base of the airfoil. Typically, the tip cap is brazed to the airfoil base using braze compound. During a brazing process, the braze compound is heated to a temperature (below melting points of the airfoil base and the tip cap) such that the braze compound between the airfoil base and the tip cap melts and thereafter bonds the airfoil components together. Typically, the braze compound is heated within a vacuum chamber which heat the entire airfoil during the brazing process. While such a brazing process and braze joint have various advantages, there is still room in the art for improvement. There is a need in the art therefore for an improved method and assembly for connecting components of an airfoil together.

SUMMARY OF THE DISCLOSURE

According to an aspect of the present disclosure, a bonding process for joining a tip cap and an airfoil base is provided. The tip cap is arranged on the airfoil base and the tip cap is diffusion bonded to the airfoil base.

According to another aspect of the present disclosure, a bonding assembly is provided. This bonding assembly includes a housing, a support fixture, an actuator and a heating element. The housing includes a first sidewall, a second sidewall and an end wall. The end wall is connected to the first sidewall and the second sidewall. The end wall is configured to engage a tip cap of an airfoil during a bonding process where the tip cap is bonded to an airfoil base of the airfoil. A cavity is formed within the housing by at least the first sidewall, the second sidewall and the end wall. The support fixture is arranged within the cavity. The support fixture is configured to support the airfoil base during the bonding process. The actuator is configured to move the support fixture within the cavity towards the end wall such that the airfoil base is pressed against the tip cap during the bonding process. The heating element is configured to heat at least an interface between the tip cap and the airfoil base during the bonding process.

According to still another aspect of the present disclosure, another bonding assembly is provided. This bonding assembly includes a housing, a first support fixture, a second support fixture, a first actuator, a second actuator, a heating system and a synchronization device. The housing includes an end wall, a first cavity and a second cavity. The end wall is configured to engage a first tip cap of a first rotor blade and to engage a second tip cap of a second rotor blade during a bonding process where the first tip cap is bonded to a first airfoil base of the first rotor blade and where the second tip cap is bonded to a second airfoil base of the second rotor blade. The first support fixture is arranged within the first cavity. The first support fixture is configured to support the first airfoil base during the bonding process. The second support fixture is arranged within the second cavity. The second support fixture is configured to support the second airfoil base during the bonding process. The first actuator is configured to move the first support fixture within the first cavity towards the end wall such that the first airfoil base is pressed against the first tip cap during the bonding process. The second actuator is configured to move the second support fixture within the second cavity towards the end wall such that the second airfoil base is pressed against the second tip cap during the bonding process. The heating system is configured to heat at least a first interface between the first tip cap and the first airfoil base and a second interface between the second tip cap and the second airfoil base during the bonding process. The synchronization device is configured to synchronize the movement of the first support fixture and the second support fixture.

The bonding process may also include locally heating at least an interface between the tip cap and the airfoil base for the diffusion bonding.

The bonding process may also include heating at least an interface between the tip cap and the airfoil base during the diffusion bonding using a heating element. The heating element may be configured with a component engaged with the tip cap.

The bonding process may also include heating at least an interface between the tip cap and the airfoil base during the diffusion bonding using a heating element. The heating element may be adjacent and extend around the interface.

The bonding process may also include cooling a component abutted against the tip cap during the diffusion bonding.

The bonding process may also include pressing the tip cap between the airfoil base and a stationary component during the diffusion bonding.

The pressing may be performed using a bellows.

The pressing may be performed using a cam.

The pressing may be performed using a spring element.

The spring element may be configured as or otherwise include a hollow metallic spherical body.

The spring element may be configured as or otherwise include a coil spring.

The bonding process may also include: providing a second tip cap and a second airfoil base; arranging the second tip cap on the second airfoil base; and diffusion bonding the second tip cap to the second airfoil base concurrently with the diffusion bonding of the first tip cap to the first airfoil base.

The heating elements may be configured with the end wall.

The heating element may be configured to be located next to and to extend around the interface between the tip cap and the airfoil base.

The bonding assembly may also include a cooling system configured to cool at least a portion of the end wall during the bonding process.

The actuator may be configured as or otherwise include an inflatable pressure vessel.

The actuator may be configured as or otherwise include a spring element within the cavity and engaged with the support fixture.

The actuator may be configured as or otherwise include a hollow metallic spherical body.

The actuator may be configured as or otherwise include a coil spring.

The bonding assembly may also include a pressure vessel within which the housing is located.

The bonding assembly may also include a second support fixture and a second actuator. The second support fixture may be arranged within a second cavity within the housing.

The second support fixture may be configured to support a second airfoil base of a second airfoil during the bonding process where a second tip cap of the second airfoil is also bonded to the second airfoil base. The second actuator may be configured to move the second support fixture within the second cavity towards the end wall such that the second airfoil base is pressed against the second tip cap during the bonding process. The end wall may be further configured to engage the second tip cap during the bonding process.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
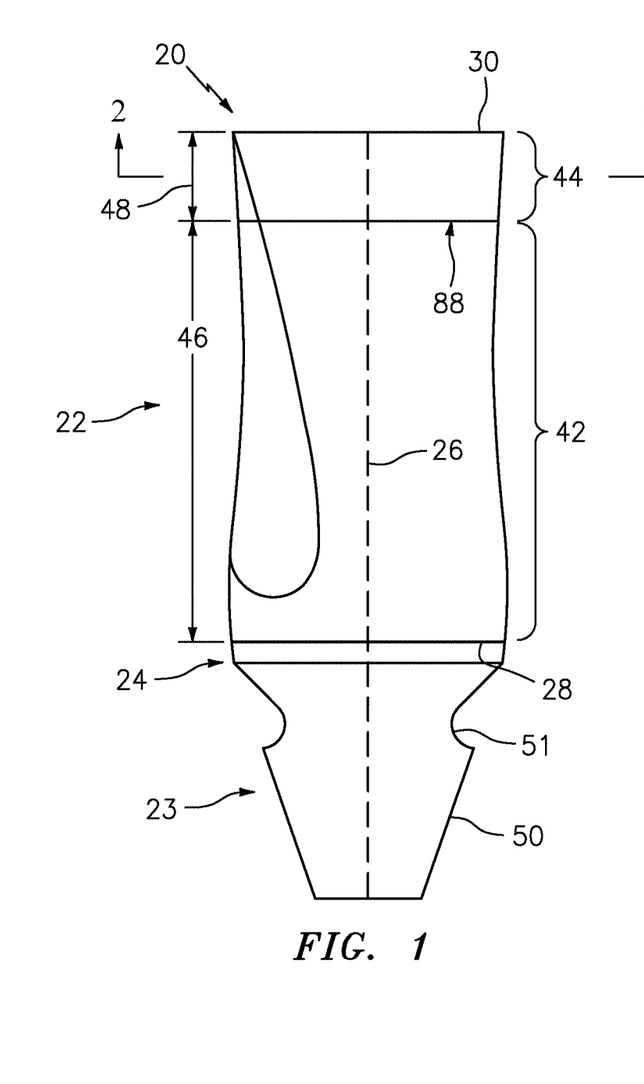
FIG. 1 is an illustration of a rotor blade.

FIG. 1 illustrates a rotor blade 20 for a piece of rotational equipment. This rotor blade 20 may be configured as a compressor blade or a turbine blade. The piece of rotational equipment may be configured as a gas turbine engine for an aircraft propulsion system such as, but not limited to, a geared or direct-drive turbofan gas turbine engine. However, the rotor blade 20 of the present disclosure is not limited to such an aircraft application nor a gas turbine engine application. The rotor blade 20, for example, may alternatively be configured with rotational equipment such as an industrial gas turbine engine, a wind turbine, a water turbine or any other apparatus which includes one or more rotor blades.

The rotor blade 20 of FIG. 1 includes a blade airfoil 22 and a blade mount 23. The rotor blade 20 of FIG. 1 also includes a blade platform 24. However, in other embodiments, the rotor blade 20 may be configured without the platform 24 where, for example, the mount 23 is connected directly to the airfoil 22 and a platform is configured as a discrete element.

Figure 2:
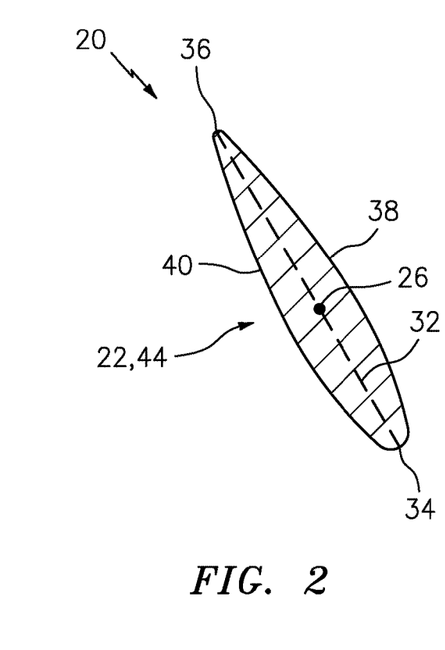
FIG. 2 is a cross-sectional illustration of an airfoil taken along line 2-2 in FIG. 1.

The airfoil 22 extends spanwise along a span line 26 between an airfoil base (e.g., radial inner) end 28 and an airfoil tip 30 (e.g., a radial out end of the airfoil 22). Referring to FIG. 2, the airfoil 22 extends longitudinally along a camber line 32 between an (e.g., forward, upstream) airfoil leading edge 34 and an (e.g., aft, downstream) airfoil trailing edge 36. The airfoil 22 extends laterally (e.g., widthwise) between an airfoil first side 38 and an airfoil second side 40. Referring to FIGS. 1 and 2, each of these blade airfoil elements 34, 36, 38 and 40 extends between and to the airfoil base end 28 and the airfoil tip 30. Note, while the airfoil 22 is depicted in FIG. 2 as a solid airfoil, the airfoil 22 may alternatively include one or more internal passages, microcircuits, etc. in other embodiments.

The airfoil 22 of FIG. 1 includes an airfoil base 42 and an airfoil tip cap 44. The airfoil base 42 forms a major portion of the airfoil 22 while the tip cap 44 forms a portion of the airfoil 22 at the airfoil tip 30. The airfoil base 42 of FIG. 1, for example, forms a portion of the airfoil 22 that projects spanwise out from the platform 24 to the tip cap 44. This airfoil base 42 has a spanwise airfoil base length 46. The tip cap 44 of FIG. 1 forms a portion of the airfoil 22 that projects spanwise out from the airfoil base 42 to the tip 30 of the airfoil 22. This tip cap 44 has a spanwise tip cap length 48. The tip cap length 48 is sized less than the airfoil base length 46. The tip cap length 48, for example, may be equal to or less than one-third (⅓) of the airfoil base length 46; e.g., less than one-fourth (¼), one-fifth (⅕), one-sixth (⅙) or even less of the airfoil base length 46. The present disclosure, however, is not limited to the foregoing exemplary length ratios.

The mount 23 is configured to attach and structurally tie the rotor blade 20 to another structure such as, but not limited to, a slotted rotor disk. The mount 23 of FIG. 1, for example, includes a root 50 and a neck 51. The mount 23, of course, may have various other configurations which include, but are not limited to, a mortise configuration, a firtree configuration, a dovetail configuration, etc.

The platform 24 is configured to form an inner peripheral portion of a flowpath. The platform 24 is arranged and connected between the mount 23 and the airfoil 22. More particularly, the platform 24 of FIG. 1 is arranged and connected spanwise between the neck 51 and the airfoil base 42.

The rotor blade 20 may have a multi-material (e.g., bi-material) construction. The rotor blade components 23, 24 and 42, for example, may be constructed from or otherwise include a first (e.g., metal) material as a monolithic body. The rotor blade components 23, 24 and 42, for example, may be cast, machined, additive manufactured and/or otherwise formed from a single mass of the first material. The tip cap 44, by contrast, may be formed discrete from the rotor blade components from a second (e.g., metal) material that is different than the first material. This second material may be selected to be harder and/or more wear resistant than the first material, or may be a material capable of improved oxidation resistance. The present disclosure, however, is not limited to such an exemplary multi-material construction. For example, in other embodiments, the second material may be the same as the first material.

Figure 3:
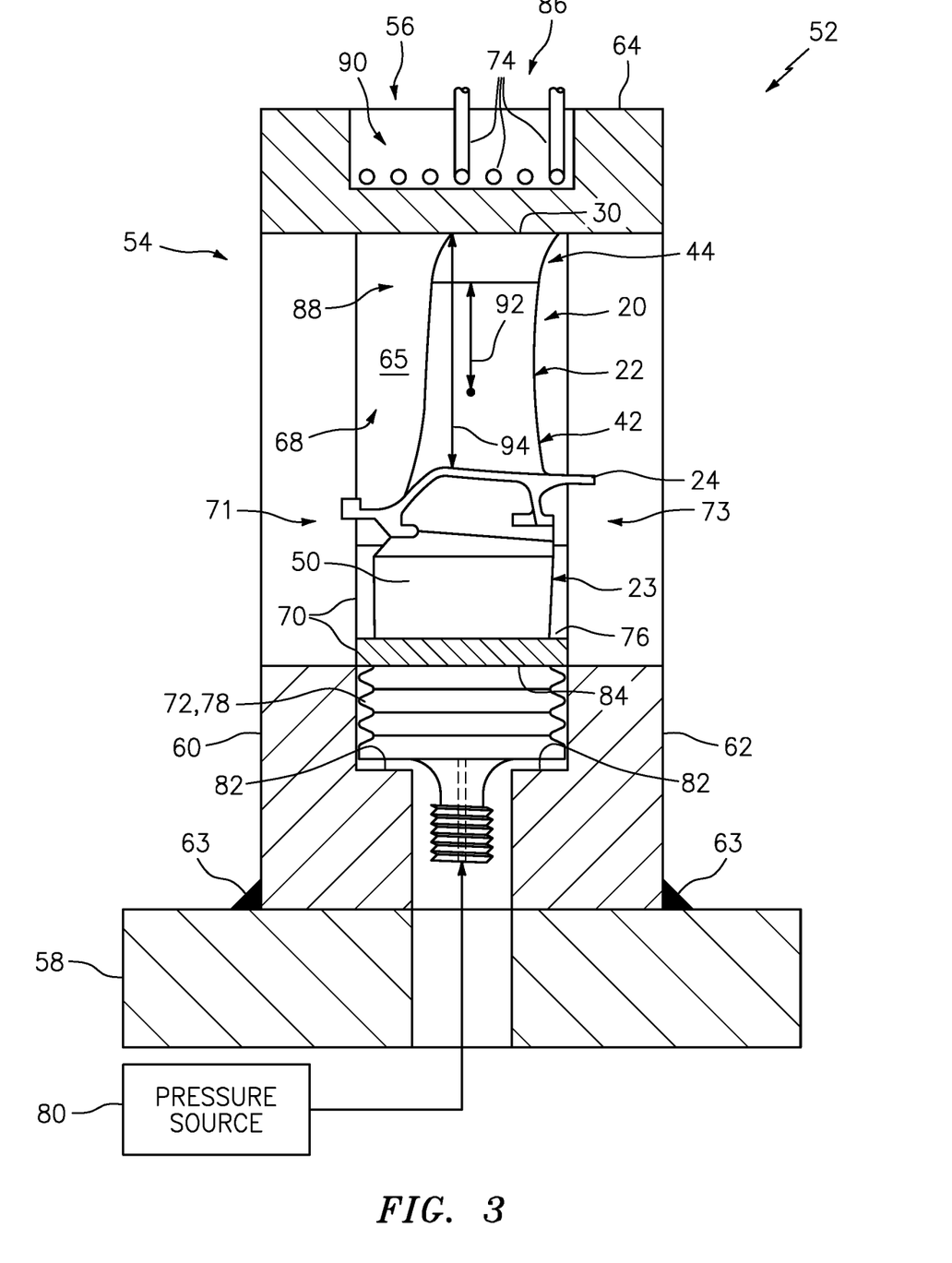
FIG. 3 is a side cutaway illustration of a bonding assembly taken along line 3-3 in FIG. 4.

FIG. 3 illustrates a bonding assembly 52 for bonding an airfoil tip cap (e.g., 44) to an airfoil base (e.g., 42) of one or more respective rotor blades (e.g., 20). The bonding assembly 52 of FIGS. 3 and 4 includes a housing 54 and one or more bonding stations 56, an exemplary one of which is shown in FIG. 3.

Figure 4:
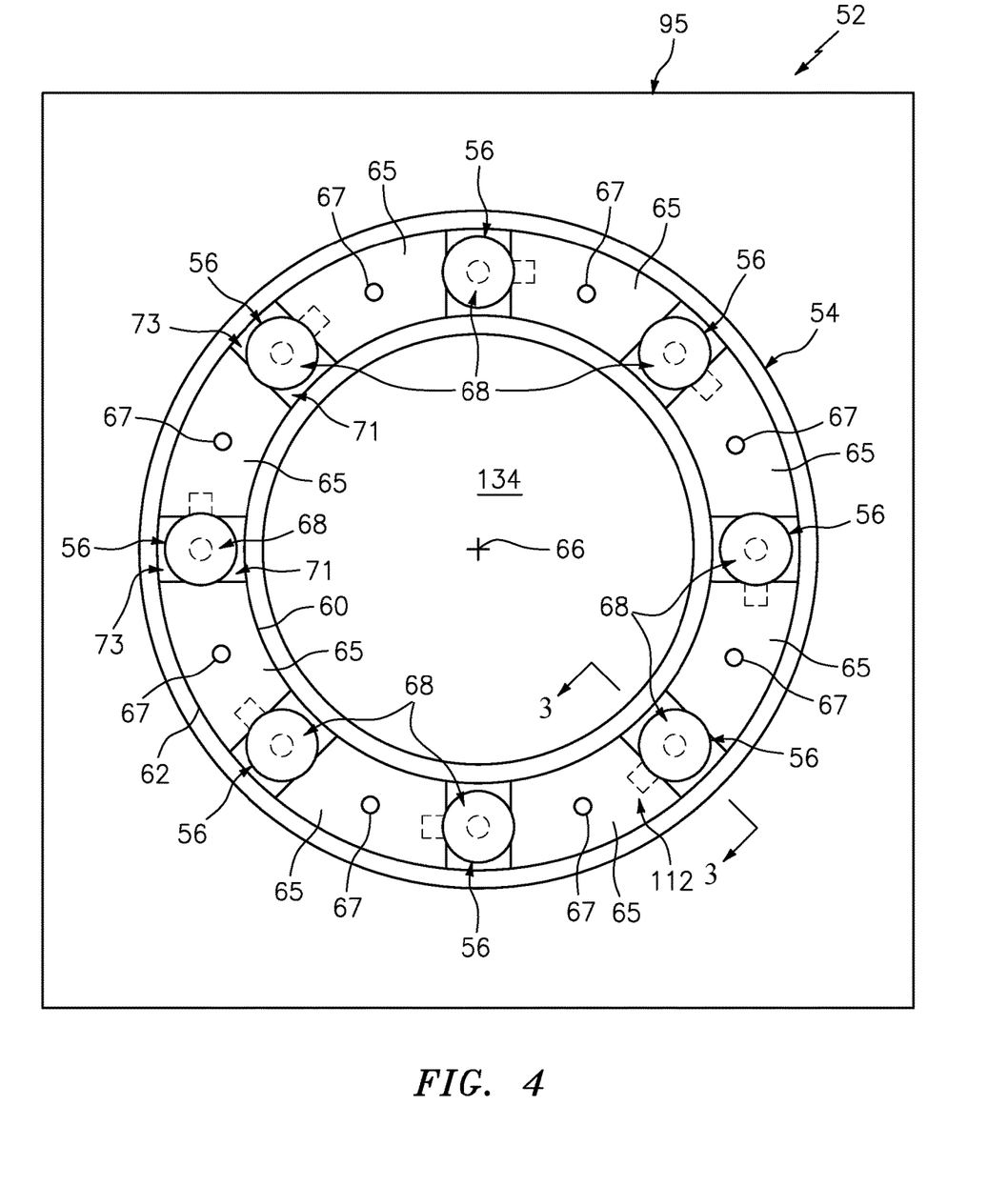
FIG. 4 is a schematic illustration of the bonding assembly.

The housing 54 of FIGS. 3 and 4 includes a housing base 58, a housing first (e.g., inner, exterior) sidewall 60, a housing second (e.g., outer, exterior) sidewall 62 and a housing end wall 64. The housing 54 of FIGS. 3 and 4 also includes one or more housing third (e.g., intermediate, interior) sidewalls 65; e.g., dividers.

The housing base 58 of FIGS. 3 and 4 extends circumferential about (e.g., completely around) a centerline 66 of the housing 54 thereby forming an annular bottom, base plate of the housing 54. The first sidewall 60 extends circumferentially about (e.g., completely around) the housing centerline 66 thereby forming a tubular inner wall portion of the housing 54. The second sidewall 62 extends circumferentially about (e.g., completely around) the housing centerline 66 as well as the first sidewall 60 thereby forming a tubular outer wall portion of the housing 54. The first sidewall 60 and the second sidewall 62 of FIG. 3 are mechanically fastened, bonded (e.g., see welds 63) and/or otherwise connected to and extend axially along the housing centerline 66 between the housing base 58 and the end wall 64. The end wall 64 extends circumferential about (e.g., completely around) the housing centerline 66 thereby forming an annular top plate of the housing 54. Each third sidewall 65 extends radially between and is connected to (e.g., formed integral with) the sidewalls 60 and 62. Each third sidewall 65 extends axially along the housing centerline 66 between and is connected to the housing base 58 and the end wall 64. Each third sidewall 65 of FIG. 4 includes at least one (e.g., threaded) bolt hole 67, which bolt hole 67 is configured to receive a respective bolt 69 (see FIG. 10) for attaching the end wall 64 to the housing components 60, 62 and 65.

The housing 54 is configured with one or more internal cavities 68. Each cavity 68 of FIG. 3 extends radially relative to the housing centerline 66 between the first sidewall 60 and the second sidewall 62. Each cavity 68 extends axially along the housing centerline 66 to the end wall 64. Each cavity 68 extends laterally (e.g., circumferentially or tangentially) between a respective laterally neighboring pair of the third sidewalls 65; see also FIG. 4. Each cavity 68 of FIGS. 3 and 4 is aligned and coupled with one or more windows 71 and 73; e.g., openings, apertures, pass-throughs, etc. The first window 71 is formed in the first sidewall 60, and extends radially through the housing 54 and its sidewall 60 to the respective cavity 68. The second window 73 is formed in the second sidewall 62, and extends radially through the housing 54 and its sidewall 62 to the respective cavity 68.

Each bonding station 56 is arranged with a respective one of the cavities 68. Each bonding station 56 of FIG. 3 includes a blade support fixture 70, an actuator 72 and a heating element 74.

The blade support fixture 70 is arranged within a respective cavity 68 and within the housing 54. The blade support fixture 70 is configured to support the airfoil base 42 of a respective one of the rotor blades 20. The blade support fixture 70 of FIG. 3, for example, is configured with a slot 76 operable to receive the mount 23 of a respective one of the rotor blades 20.

The actuator 72 is configured to move the blade support fixture 70 within the cavity 68 such that the airfoil base 42 is pressed against the tip cap 44 during a bonding process. The actuator 72 of FIG. 3, for example, is configured as an inflatable pressure vessel 78 (e.g., a bellows) fluidly coupled to a fluid source 80; e.g., a pressurized gas source (e.g., an air compressor, an air tank, etc.) or a hydraulic pressure source (e.g., a hydraulic pump, a hydraulic piston, etc.). This inflatable pressure vessel 78 is arranged within the cavity 68 and seated against a shelve surface 82 of the first sidewall 60 and the second sidewall 62. The inflatable pressure vessel 78 is vertically below and engaged with (e.g., contacts) a bottom end 84 of the blade support fixture 70. With this arrangement, the inflatable pressure vessel 78 is operable to push the blade support fixture 70 away from the shelve surfaces 82 and, thus, push the blade support fixture 70 towards the end wall 64.

The heating element 74 is configured part of a heating system 86. The heating element 74 and, more broadly, the heating system 86 are configured to heat at least an interface 88 between the tip cap 44 and the airfoil base 42 of a respective one of the rotor blades 20 during the bonding process. The heating element 74 of FIG. 3, for example, is configured with one or more electrical resistance heating coils located within a pocket 90 in the end wall 64. The heating element 74 of FIG. 3 is thereby configured to heat the interface 88 as well as the tip cap 44 via conduction through the end wall 64.

Figure 5:
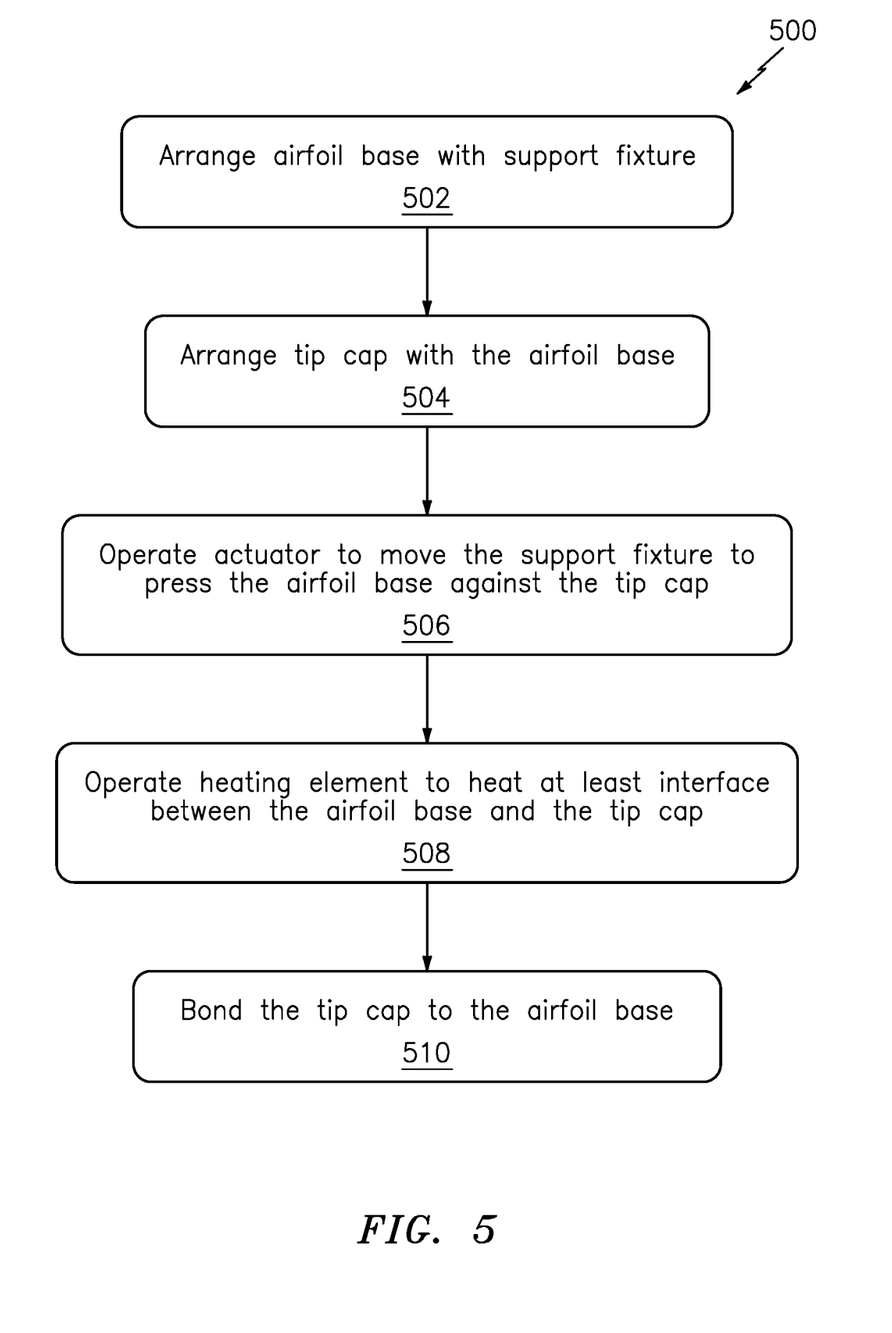
FIG. 5 is a flow diagram of a bonding process for bonding a tip cap to an airfoil base for one or more rotor blades.

FIG. 5 is a flow diagram of a bonding process 500 for bonding an airfoil tip cap (e.g., 44) to an airfoil base (e.g., 42) of one or more rotor blades (e.g., 20). For ease of description, the bonding process 500 is described below with reference to the rotor blade 20 of FIGS. 1 and 2 and the bonding assembly 52 of FIGS. 3 and 4. The bonding process 500 of the present disclosure, however, is not limited to such exemplary elements. For example, the bonding process 500 may also or alternatively be performed using any one of the other bonding assembly configurations described below with reference to, for example, FIGS. 6 and 8-10.

Referring to FIGS. 3 and 5, in step 502, each airfoil base 42 is arranged with each respective blade support fixture 70. The root 50 of each airfoil base 42, for example, is mated with (e.g., slid/inserted into) the slot 76 in the respective blade support fixture 70.

In step 504, each tip cap 44 is arranged with (e.g., on) each respective airfoil base 42. Each tip cap 44 is thereby positioned axially along the housing centerline 66 as well as spanwise between the respective airfoil base 42 and the end wall 64.

In step 506, each actuator 72 is operated to move the respective blade support fixture 70 towards the end wall 64. Each inflatable pressure vessel 78, for example, may be pressurized/inflated such that the inflatable pressure vessel 78 pushes the respective blade support fixture 70 towards the end wall 64. This movement of the blade support fixture 70 in turn causes the respective airfoil base 42 and tip cap 44 to also move towards the end wall 64. At the position in FIG. 3, the respective tip cap 44 engages (e.g., contacts, abuts against) the end wall 64 and is thereby pressed between the respective airfoil base 42 and the end wall 64 (a fixed component of the housing 54). This pressing generates a pressure force at the interface 88 between the respective airfoil base 42 and tip cap 44.

In step 508, each heating element 74 is operated to (e.g., locally) heat at least the respective interface 88. In the embodiment of FIG. 3, the heating element 74 locally heats the interface 88 and the respective tip cap 44 via conduction through a portion of the end wall 64 between the heating element 74 and the respective tip cap 44. By locally heating the interface 88 in this manner, other (e.g., lower) portions of the respective rotor blade 20 and its airfoil 22 may remain unheated and/or heated to a relatively low temperature via conduction through the respective airfoil base 42. For example, the heating element 74 may heat the interface 88 to an elevated first temperature whereas a portion of the airfoil base 42 a distance 92 below the interface 88 may be at a second temperature that is less than the first temperature. By way of example, the first temperature may be at least two times (2×), three times (3×), five time (5×), ten times (10×) or more the second temperature where the distance 92 is, for example, greater than one-quarter (¼), one-third (⅓) or one-half (½) of the airfoil span 94. In one exemplary embodiment, the first temperature may be in a range of 2300° F. to 2400° F. and the second temperature may be below 1000° F. at a midpoint of the airfoil 22; e.g., where the distance 92 is one-half of the distance 94. The present disclosure, however, is not limited to the foregoing exemplary temperature differential and/or distances.

In step 510, each tip cap 44 is bonded to the respective airfoil base 42. More particularly, as pressure and heat is applied to the interface 88 between the airfoil components 42 and 44, those components 42 and 44 are diffusion bonded together. Herein, the term "diffusion bonding" may describe a solid-state bonding/welding process whereby atoms from the airfoil components 42 and 44 at the interface 88 therebetween intersperse themselves over a period of time. Examples of such diffusion bonding include, but are not limited to, transient liquid phase (TLP) diffusion bonding, field-assisted sintering (FAST) diffusion bonding and initial liquid interface diffusion (LID) bonding. This diffusion bonding of the airfoil components 42 and 44 is facilitated by the application of pressure and heat via the steps 506 and 508, which are performed during as well as before and/or after the bonding step 510. After this bonding, each tip cap 44 is fixedly secured to the respective airfoil base 42 to provide a respective one of the airfoils 22.

It is worth noting, by locally heating each interface 88 during the bonding process 500, other (e.g., remote) portions of the respective rotor blade 20 may not be affected by the heating. By contrast, if the entire rotor blade 20 was heated during the bonding, portion of the rotor blade remote from the interface 88 may be subject to heating side effects such as, but not limited to, rotor blade material microstructural changes and/or internal stresses.

In some embodiments, the bonding process 500 may be performed within a pressure vessel 95 as shown, for example, in FIG. 4. Thus, the bonding process 500 may be performed under vacuum and/or in an inert gas or other compatible gas environment.

Figure 6:
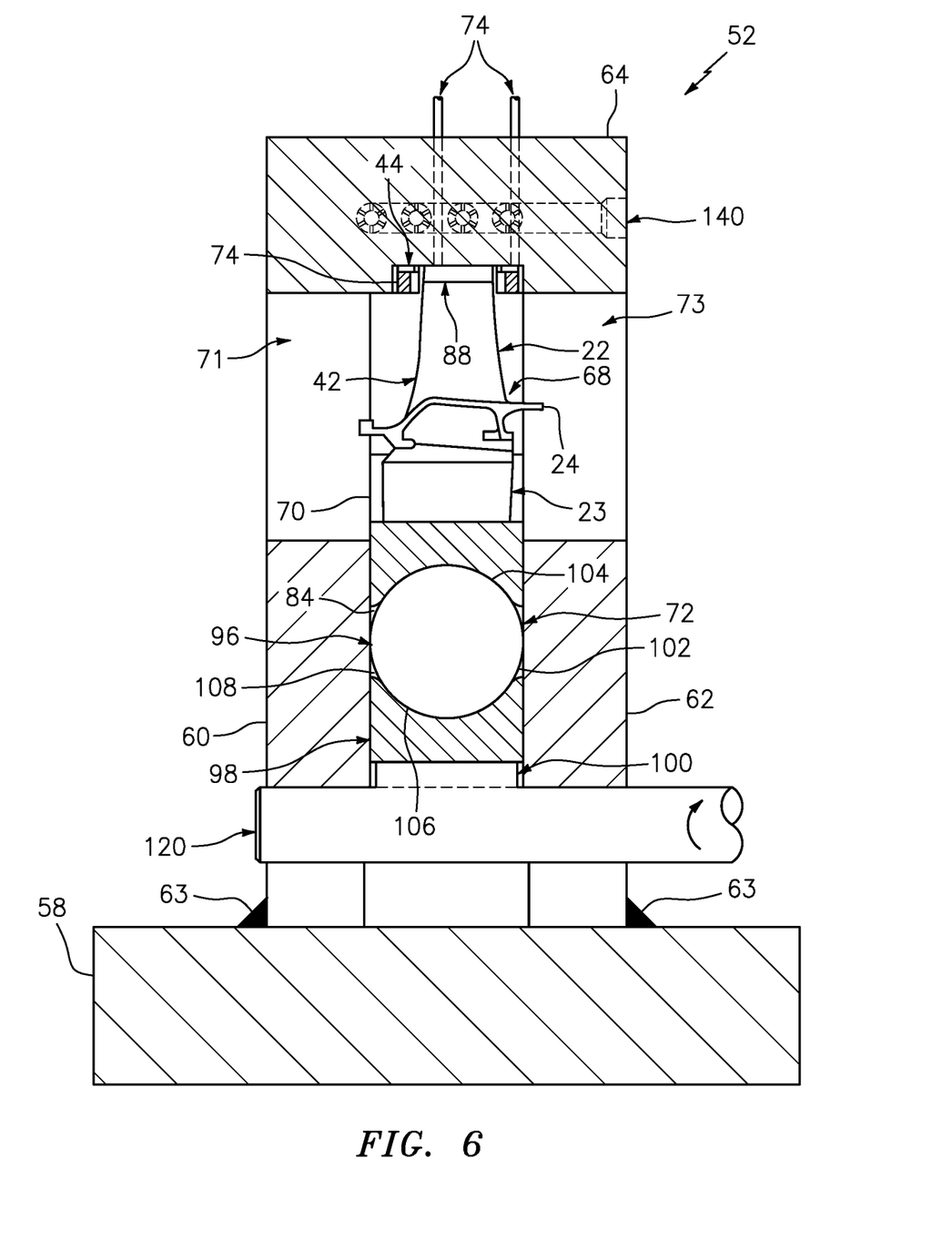
FIG. 6 is a side cutaway illustration of the bonding assembly with an alternative actuator.
Figure 7A:
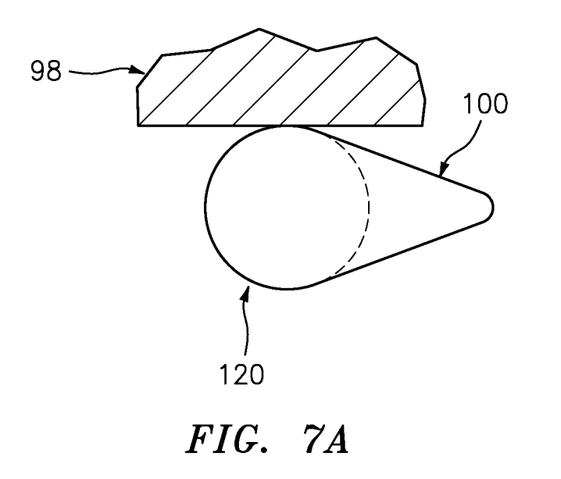
FIG. 7A is a schematic illustration of a cam shaft engaging a support fixture at a first position.
Figure 7B:
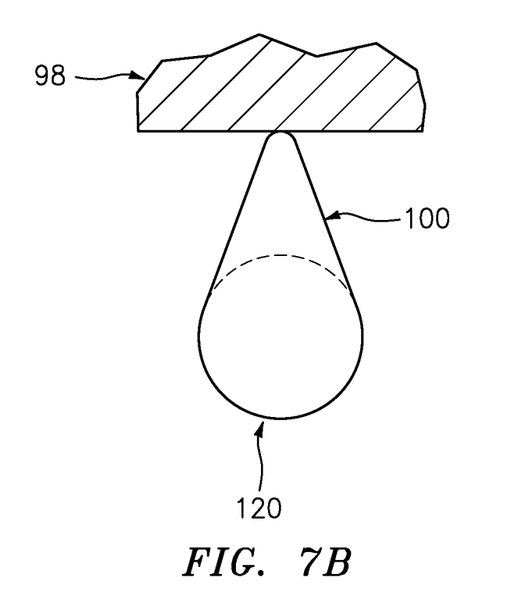
FIG. 7B is a schematic illustration of the cam shaft engaging the support fixture at a second position.

One or more or each actuator 72 may have various other configurations than that described above and illustrated in FIG. 3. For example, referring to FIG. 6, each actuator 72 may include a spring element 96, a spring element support fixture 98 and a cam 100 (e.g., a ramp). In the embodiment of FIG. 6, the spring element 96 is configured as a (e.g., thin walled, metallic) compressible hollow spherical body 102. This spherical body 102 is arranged within the cavity 68. The spherical body 102 is seated in a pocket 104 at the bottom end 84 of the blade support fixture 70 as well as in a pocket 106 at a top end 108 of the spring element support fixture 98. The spherical body 102 is thereby between and engaged with (e.g., contacting) the support fixtures 70 and 98. The spring element support fixture 98 is arranged within the cavity 68. The cam 100 is positioned below and engaged with (e.g., contacting) the spring element support fixture 98. The cam 100 is configured to rotate between a first position (see FIG. 7A) and a second position (see FIG. 7B). In the first position, the cam 100 lowers the spring element support fixture 98 to a bottom position which enable the respective airfoil base 42 and tip cap 44 to be arranged within the housing 54. In the second position, the cam 100 raises the spring element support fixture 98 to a top position (see FIG. 6) which presses the rotor blade components 42 and 44 against one another at the interface 88 as described above.

Figure 8:
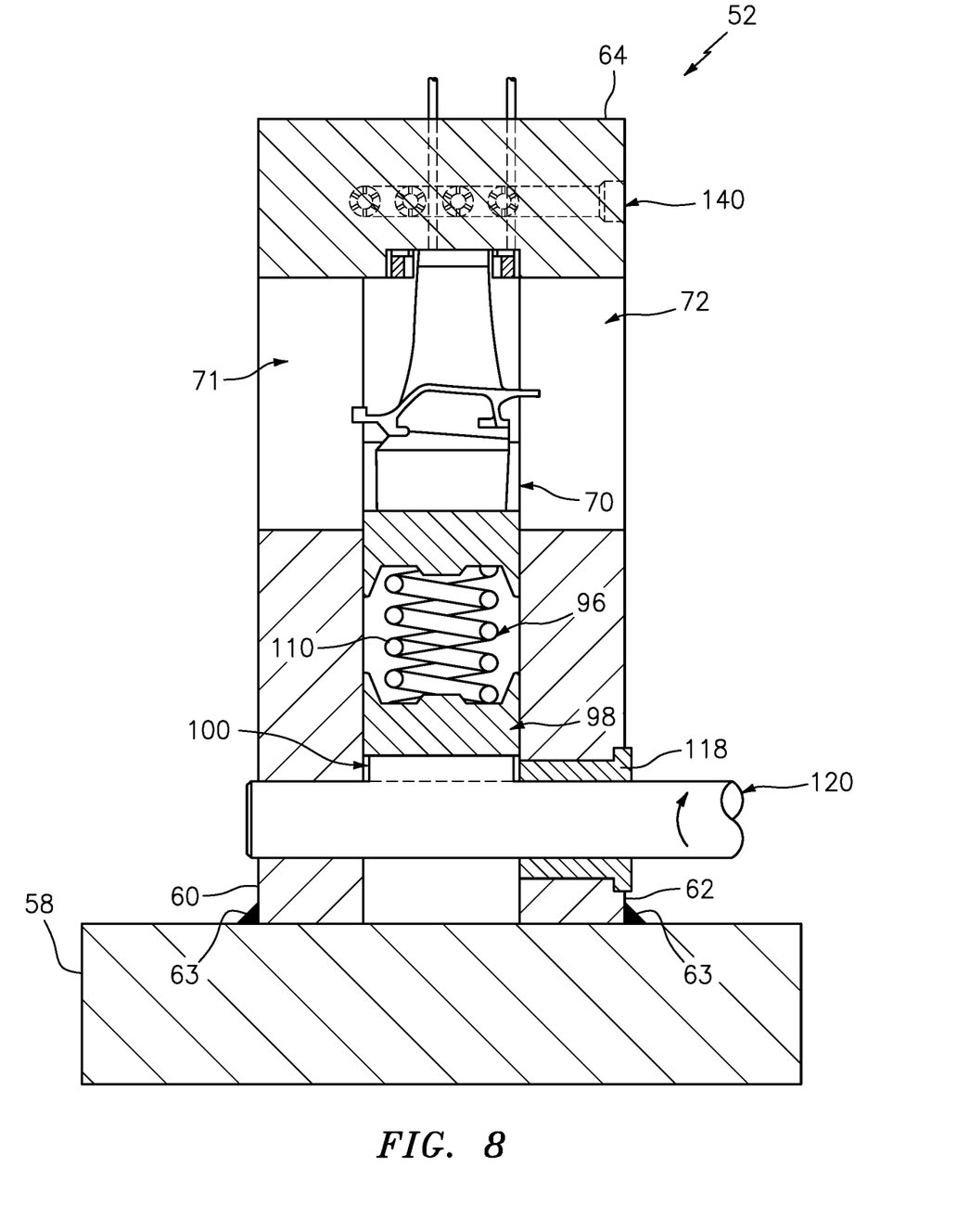
FIG. 8 is a side cutaway illustration of the bonding assembly with an alternative actuator.

In some embodiments, referring to FIG. 8, each spring element 96 may alternatively be configured as a (e.g., metal) coil spring 110; e.g., a nickel (Ni) alloy (e.g., Waspaloy) metal coil spring. Such a coil spring 110 may enable more movement and/or tolerance in movement of the blade support fixture 70 as compared to, for example, the spherical body 102.

In some embodiments, referring to FIGS. 6 and 8, the blade support fixture 70 may be configured with an anti-rotation feature 112. The blade support fixture 70 of FIGS. 6 and 8, for example, is configured with a protrusion 114 (e.g., a pin or fastener). This protrusion 114 is connected to the blade support fixture 70 and projects into an axially extending groove 116 on one of the sidewalls 60 and 62; e.g., the first sidewall 60.

In some embodiments, referring to FIG. 8, at least one of the sidewalls 60 and 62 (e.g., the second sidewall 62) may include a bushing 118 for supporting a cam shaft 120 that includes the cam 100.

Figure 9:
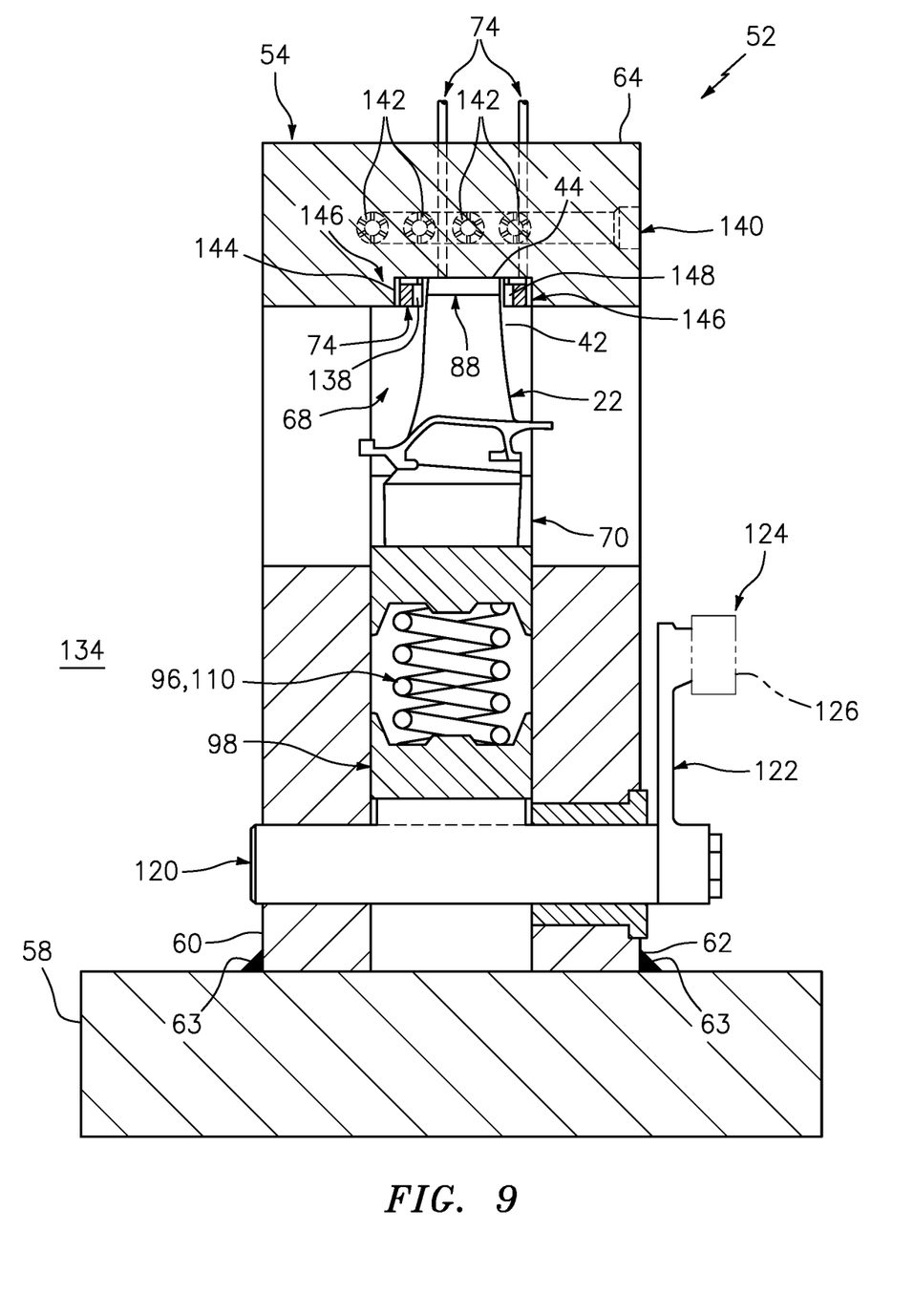
FIG. 9 is a side cutaway illustration of the bonding assembly with still another alternative actuator.
Figure 10:
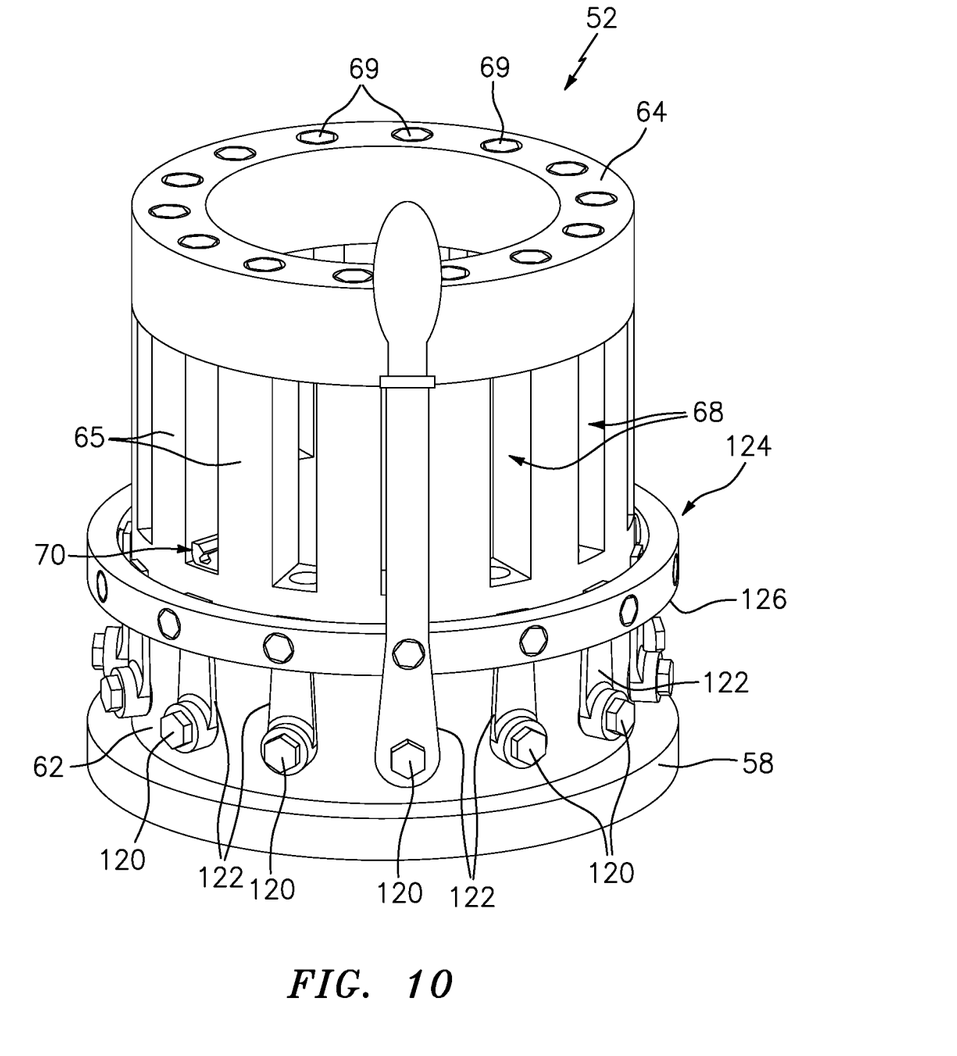
FIG. 10 is a perspective illustration of the bonding assembly of FIG. 9 where certain blade support fixtures are not shown for ease of illustration.
Figure 11:
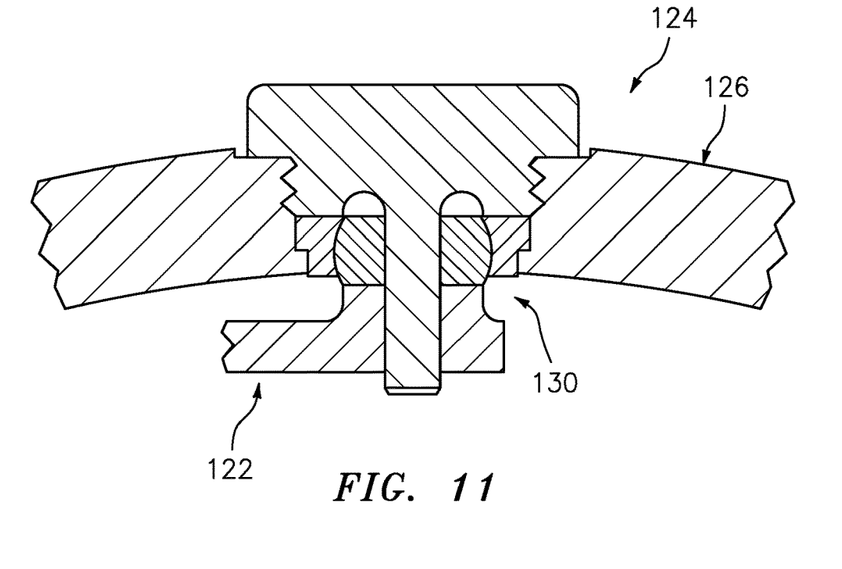
FIG. 11 is a partial sectional illustration of a moveable joint between a cam arm and a synchronization ring device.

In some embodiments, referring to FIGS. 9 and 10, each cam shaft 120 may be coupled to a cam arm 122 (e.g., a lever) for turning the cam shaft 120. Each cam arm 122 may in turn be coupled to a synchronization device 124 configured to synchronize the movement of the cams 100 and, thus, the support fixtures 70. The synchronization device 124 of FIG. 10 is configured as a synchronization ring device 126 (e.g., a synch ring) which may be actuated by an actuation lever 128. Each cam arm 122 may be coupled to the synchronization ring device 126 through a moveable joint 130 such as, but not limited to, a uniball joint as shown in FIG. 11. Such a moveable joint 130 enables angular misalignment between the synchronization ring device 126 and the cam arm 122 that results from the synchronization ring device 126 rotation about and axial movement along the housing centerline 66.

Figure 12:
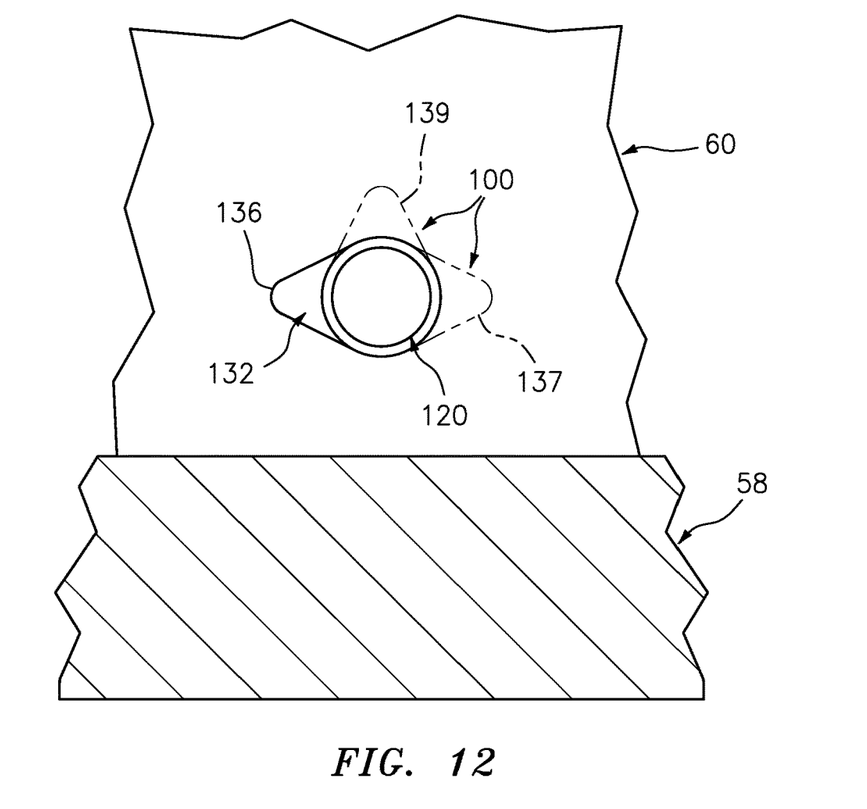
FIG. 12 is a partial cutaway illustration of an orifice in a housing of the bonding assembly.

Referring to FIG. 12, in some embodiments, the first sidewall 60 may include a cam shaped orifice 132 which enables installation of the cam shaft 120 with the housing 54 from an interior bore 134 of the housing 54 (see FIG. 4). The cam shaped orifice 132 may be arranged such that the cam 100 does not overlap a peak 136 of the orifice 132 in either its first or second position depicted by dashed lines 137 and 139, or therebetween.

Figure 13:
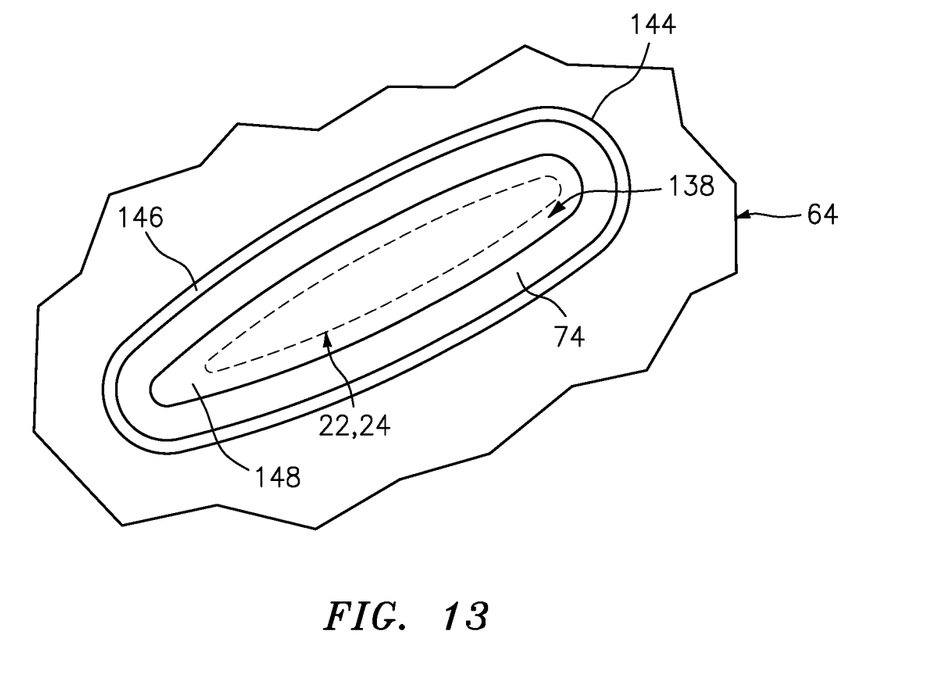
FIG. 13 is an illustration of a heating element with an airfoil shaped aperture.

Referring to FIG. 9, in some embodiments, the heating element 74 (or an additional heating element) may also or alternatively be configured within the cavity 68 and adjacent the end wall 64. One of the heating elements 74 of FIG. 9, for example, includes an aperture 138 that receives the respective tip cap 44 and, in some embodiments, a portion of the respective airfoil base 42. The heating element 74 may thereby extend (e.g., completely) around the respective interface 88. Referring to FIG. 13, this aperture 138 may have an airfoil cross-sectional geometry such that the heating element 74 closely follows, engages and/or is spaced evenly from the (e.g., entire) interface 88 (see FIG. 9). With this arrangement, the heating element 74 may efficiently and rapidly concentrate heat onto the interface 88 for the bonding process.

In the embodiment of FIG. 13, the heating element 74 is seated within a pocket 144 in the end wall 64. The heating element 74 of FIG. 13 is separated from the end wall 64 by an insulator 146 such as, but not limited to, ceramic (e.g., mica). This insulator 146 is configured to prevent arcing between the heating element 74 and the end wall 64. The aperture 138 of FIG. 13 may be sized such that there is a uniform space 148 between the heating element 74 and the airfoil 22 and its blade tip 44.

Referring again to FIG. 9, in some embodiments, the housing 54 may be configured with a cooling system 140. This cooling system 140 may include one or more passages 142 within, for example, the end wall 64. These passages 142 are configured to flow a cooling medium (e.g., coolant) for cooling at least a portion (e.g., the end wall 64) during the heating step 508. In some embodiments, one or more of the passages 142 may be configured with one or more cooling features such as, but not limited to, cooling protrusions (e.g., cooling fins), cooling apertures (e.g., channels) and/or the like. Such cooling features may be provided by forming the end wall 64 via, for example, casting and/or additive manufacturing. The present disclosure, however, is not limited to any particular end wall formation techniques or internal configurations.

Figure 14:
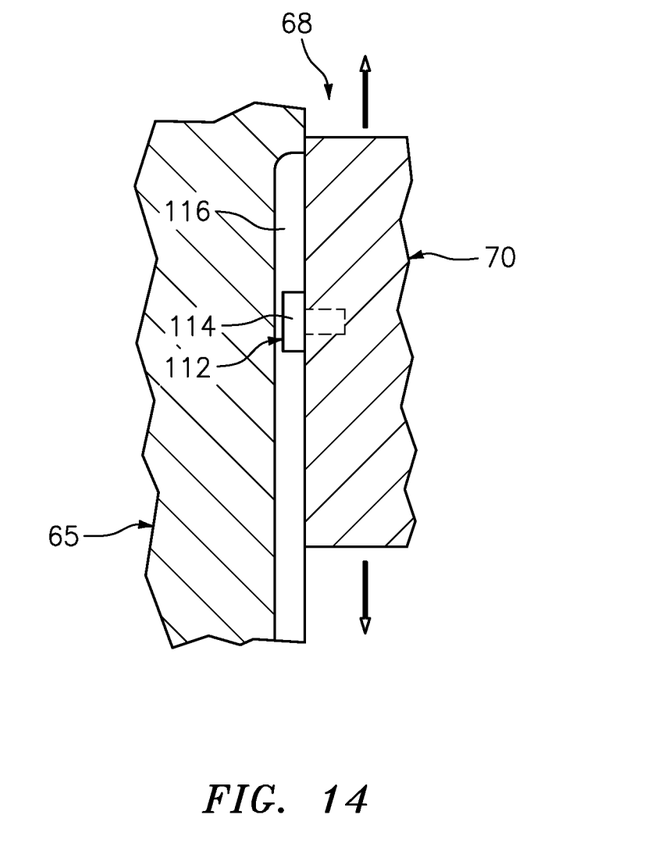
FIG. 14 is a partial sectional illustration of an interface with an anti-rotation feature between the support fixture and a sidewall.
Figure 15:
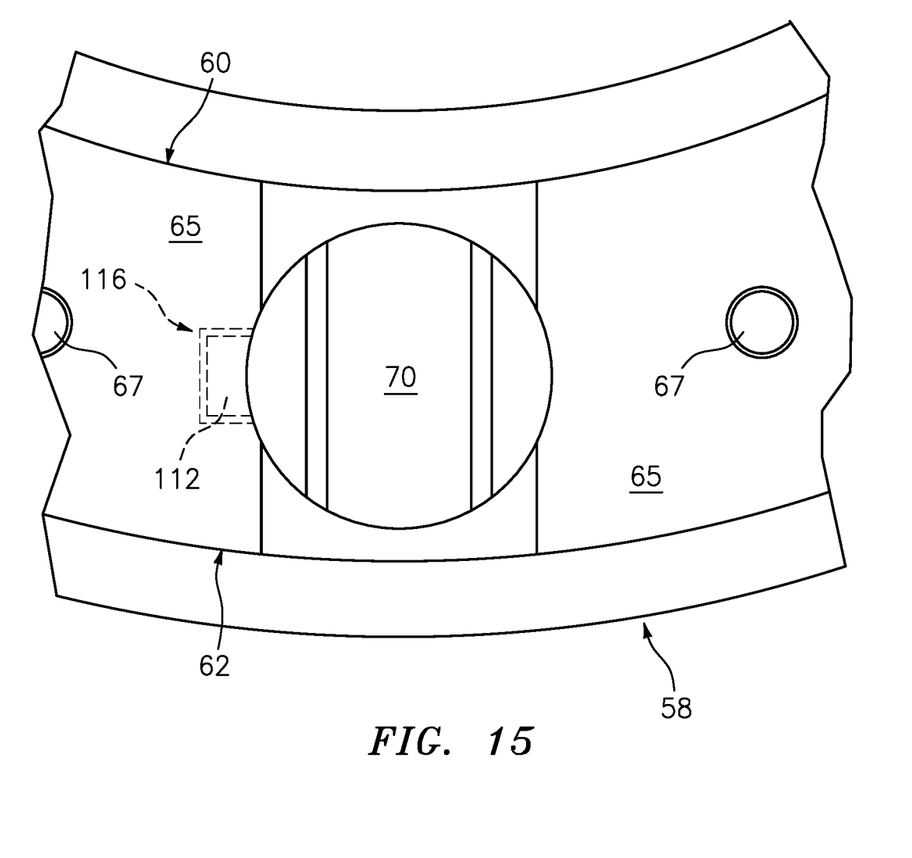
FIG. 15 is a partial schematic illustration of the bonding assembly with the anti-rotation feature between the support fixture and the sidewall.

In some embodiments, referring to FIGS. 14 and 15, the blade support fixture 70 may be configured with an anti-rotation feature 112. The blade support fixture 70 of FIG. 14, for example, is configured with a protrusion 114 (e.g., a pin or fastener). This protrusion 114 is connected to the blade support fixture 70 and projects into an axially extending groove 116 on one of the sidewalls 60, 62, 65; e.g., the third sidewall 65.

Figure 16A:
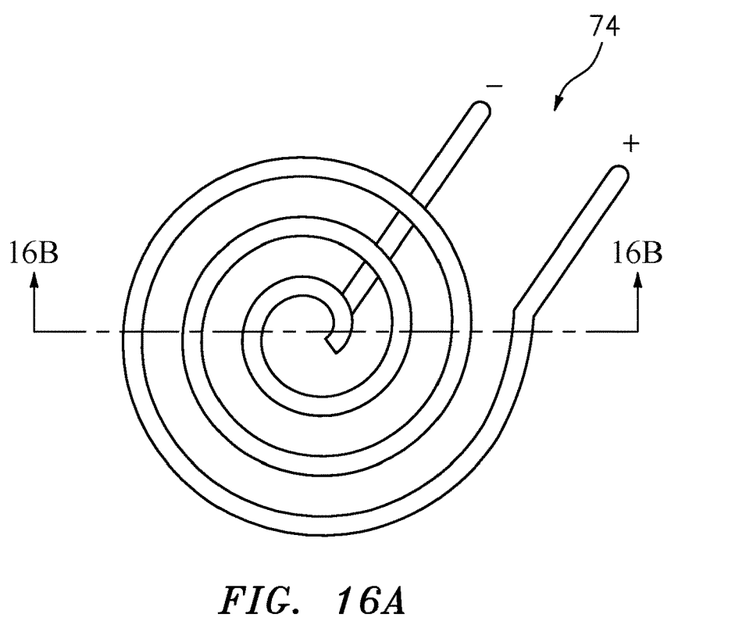
FIG. 16A is an illustration of an exemplary heating element.
Figure 16B:
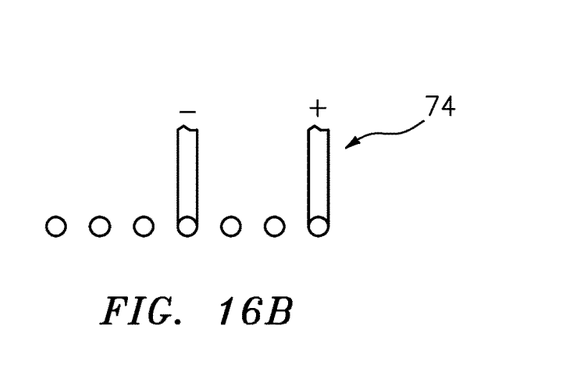
FIG. 16B is a sectional illustration of the heating element of FIG. 16A taken along line 16B-16B.

FIGS. 16A and 16B illustrate an exemplary embodiment of the heating element 74 seated within the pocket 90 (e.g., see FIG. 3). This exemplary heating element 74 is configured as a circular (e.g., spiraled) heating coil; e.g., a tungsten heating coil.

Figure 17:
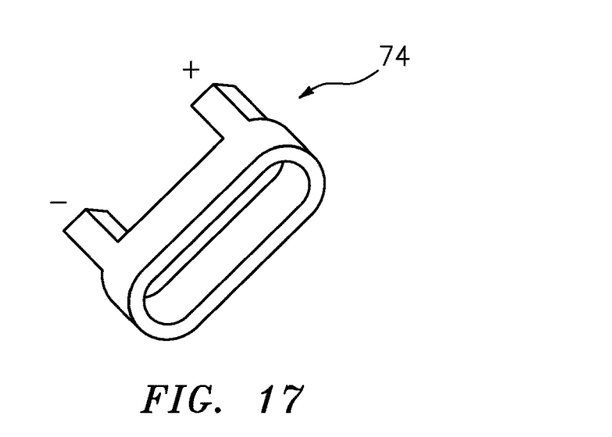
FIG. 17 is a perspective illustration of another exemplary heating element.

FIG. 17 illustrates an exemplary embodiment of the heating element 74 seated within the pocket 144 (e.g., see FIGS. 9 and 13). This heating element 74 of FIG. 17 is configured as an airfoil shaped collar heating element; e.g., a tungsten collar heating element.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A bonding process, comprising:
providing a tip cap and an airfoil base;
arranging the tip cap on the airfoil base;
diffusion bonding the tip cap to the airfoil base;
heating at least an interface between the tip cap and the airfoil base during the diffusion bonding using a heating element, wherein the heating element is adjacent and extends around the interface; and
cooling a component abutted against the tip cap during the diffusion bonding.

2. The bonding process of claim 1, further comprising pressing the tip cap between the airfoil base and a stationary component during the diffusion bonding.

3. The bonding process of claim 2, wherein the pressing is performed using a bellows.

4. The bonding process of claim 2, wherein the pressing is performed using a cam.

5. The bonding process of claim 2, wherein the pressing is performed using a spring element.

6. The bonding process of claim 1, further comprising:
providing a second tip cap and a second airfoil base;
arranging the second tip cap on the second airfoil base; and
diffusion bonding the second tip cap to the second airfoil base concurrently with the diffusion bonding of the tip cap to the airfoil base.

* * * * *